(12) United States Patent
Riedel et al.

(10) Patent No.: US 7,568,874 B2
(45) Date of Patent: Aug. 4, 2009

(54) NUT FOR ATTACHING TWO DEVICES AND METHOD FOR PROVIDING THE SAME

(75) Inventors: Richard Paul Riedel, Mason, OH (US); William Joseph Cruzen, Monticello, MN (US); Lester Charles Sporing, Loveland, OH (US); Jason Alan Born, Loveland, OH (US)

(73) Assignee: PuR Water Purification Products, Inc., Cincinnati, OH (US)

( * ) Notice: Subject to any disclaimer, the term of this patent is extended or adjusted under 35 U.S.C. 154(b) by 342 days.

(21) Appl. No.: 11/446,580

(22) Filed: Jun. 2, 2006

(65) Prior Publication Data

US 2007/0292237 A1    Dec. 20, 2007

(51) Int. Cl.
F16B 37/16    (2006.01)
(52) U.S. Cl. .................................. 411/435; 411/935
(58) Field of Classification Search ............... 411/435, 411/429, 430, 911, 910, 405; D8/300; 210/238, 210/DIG. 17; 285/38, 39
See application file for complete search history.

(56) References Cited

U.S. PATENT DOCUMENTS

| 248,975 A | 11/1881 | Wooten |
| 364,181 A | 5/1887 | Love |
| D44,718 S | 6/1913 | McMurtrie |
| 1,302,845 A | 5/1919 | Redmer |
| 2,369,865 A | 2/1945 | Spencer |
| 2,502,642 A | 4/1950 | Currlin |
| 2,770,998 A | 11/1956 | Schwartz |
| 3,009,722 A | 11/1961 | Augustin |
| D194,089 S | 11/1962 | Nilsen |
| 3,342,235 A | 9/1967 | Pylypyshyn |
| 3,810,291 A | 5/1974 | Ladouceur |
| 3,929,152 A * | 12/1975 | Graham ...................... 137/296 |
| D239,594 S | 4/1976 | Dieme |
| 4,172,796 A * | 10/1979 | Corder ....................... 210/238 |
| D262,940 S | 2/1982 | Spinner |
| 4,389,766 A | 6/1983 | Capuano |
| 4,504,389 A | 3/1985 | Rundzaitis |
| 4,609,463 A * | 9/1986 | Macevicz et al. ........... 210/238 |
| D295,370 S | 4/1988 | Carlo et al. |
| 4,737,058 A | 4/1988 | Callman et al. |
| D302,109 S * | 7/1989 | Cayce et al. ................. D8/398 |
| D302,201 S | 7/1989 | Hengesbach |
| 4,980,073 A | 12/1990 | Woodruff |
| D328,942 S | 8/1992 | Igami et al. |
| 5,340,256 A * | 8/1994 | Morgan ...................... 411/405 |
| 5,527,451 A | 6/1996 | Hembree et al. |

(Continued)

FOREIGN PATENT DOCUMENTS

AU    9852043 A    7/1998

(Continued)

*Primary Examiner*—Gary Estremsky
(74) *Attorney, Agent, or Firm*—Kelly L. McDow; Andrew A. Paul

(57) ABSTRACT

A nut that includes a body having an aperture disposed within the body, threads located within the aperture of the body, and a plurality of gripping areas disposed along a circumference of the body. The plurality of gripping areas provides visual and tactile directional signals as to the rotational direction required to attach or detach the nut to or from a threaded member. The nut may be used for attaching a water filter system to a water faucet.

10 Claims, 6 Drawing Sheets

U.S. PATENT DOCUMENTS

| | | | |
|---|---|---|---|
| 5,553,984 A * | 9/1996 | Smith | 411/429 |
| D374,814 S | 10/1996 | Saito | |
| 5,701,934 A | 12/1997 | Kuran et al. | |
| D390,436 S | 2/1998 | Vaagen | |
| D390,923 S | 2/1998 | Stevens | |
| 5,775,744 A | 7/1998 | Smith, III | |
| D398,369 S | 9/1998 | Hayes et al. | |
| 5,833,849 A | 11/1998 | Primdahl | |
| D404,472 S | 1/1999 | Tickle | |
| 5,888,381 A | 3/1999 | Primdahl et al. | |
| D408,506 S | 4/1999 | Gottwald | |
| 5,890,857 A | 4/1999 | Herrera | |
| D410,728 S | 6/1999 | Kurth et al. | |
| D413,967 S | 9/1999 | Yuen | |
| D420,107 S | 2/2000 | Kinder | |
| D434,834 S | 12/2000 | Goto | |
| D435,652 S | 12/2000 | Nazarifar et al. | |
| 6,158,936 A | 12/2000 | Thommes | |
| D437,919 S | 2/2001 | Chao | |
| D438,603 S | 3/2001 | Chao | |
| D441,436 S | 5/2001 | Chao | |
| 6,305,724 B1 | 10/2001 | Sampson | |
| 6,317,905 B1 | 11/2001 | Slothower | |
| 6,322,696 B1 | 11/2001 | McKee et al. | |
| D454,615 S | 3/2002 | Neal | |
| D457,604 S | 5/2002 | Chen | |
| 6,386,596 B1 | 5/2002 | Olson | |
| D458,351 S | 6/2002 | Chen | |
| D458,352 S | 6/2002 | Chen | |
| D458,353 S | 6/2002 | Chen | |
| 6,421,849 B1 | 7/2002 | Gray | |
| D463,527 S | 9/2002 | Guo | |
| 6,616,197 B2 | 9/2003 | Sampson | |
| 6,662,822 B2 | 12/2003 | Fuller | |
| 6,672,628 B2 | 1/2004 | Thomas et al. | |
| D496,094 S | 9/2004 | Stevens | |
| 6,797,156 B2 | 9/2004 | Chau | |
| D504,809 S | 5/2005 | Sato | |
| 6,912,742 B1 | 7/2005 | Wang | |
| 6,994,500 B2 | 2/2006 | Ward et al. | |
| 7,017,838 B2 | 3/2006 | Schmon | |
| D518,555 S | 4/2006 | De Muro | |
| 7,032,260 B2 | 4/2006 | Hwang | |
| D521,614 S | 5/2006 | Kitagawa | |
| 7,036,752 B1 | 5/2006 | Hsiang | |
| 7,112,025 B2 | 9/2006 | Ward et al. | |
| D534,796 S | 1/2007 | Falkenburg | |
| D538,885 S | 3/2007 | Huang | |
| 7,214,314 B2 * | 5/2007 | Reyniers | 210/232 |
| D547,828 S | 7/2007 | Huang | |
| D554,237 S | 10/2007 | Lewis et al. | |
| D561,019 S | 2/2008 | Riedel | |
| D568,149 S | 5/2008 | Riedel | |
| 2002/0136617 A1 | 9/2002 | Imahigashi | |
| 2003/0034285 A1 * | 2/2003 | Hembree | 210/87 |
| 2003/0082028 A1 | 5/2003 | Winker | |
| 2003/0094200 A1 * | 5/2003 | Fuller | 137/383 |
| 2003/0173273 A1 | 9/2003 | Giordano et al. | |
| 2004/0042872 A1 | 3/2004 | Ward et al. | |
| 2004/0231048 A1 | 11/2004 | Sallick | |
| 2005/0035054 A1 | 2/2005 | Chu | |
| 2005/0072728 A1 | 4/2005 | Chang | |
| 2005/0098485 A1 | 5/2005 | Boyd | |
| 2006/0013670 A1 | 1/2006 | Sullivan et al. | |
| 2006/0032753 A1 | 2/2006 | Hsien | |
| 2006/0037656 A1 | 2/2006 | Golan et al. | |
| 2006/0053549 A1 | 3/2006 | Wei | |
| 2006/0266850 A1 | 11/2006 | Weinberger et al. | |
| 2007/0151021 A1 | 7/2007 | Shieh | |

FOREIGN PATENT DOCUMENTS

| | | |
|---|---|---|
| DE | 306294 | 6/1917 |
| EP | 0 947 231 A1 | 6/1999 |
| GB | 2034847 | 6/1980 |
| GB | 2 269 644 A | 2/1994 |
| GB | 2 421 555 | 6/2006 |
| JP | 2000033206 A | 2/2000 |
| JP | 2004322098 A | 12/2004 |
| RU | 2236281 C1 | 9/2004 |
| RU | 2238786 C1 | 10/2004 |
| WO | WO 00/58056 A1 | 10/2000 |
| WO | 2005047754 A1 | 5/2005 |

* cited by examiner

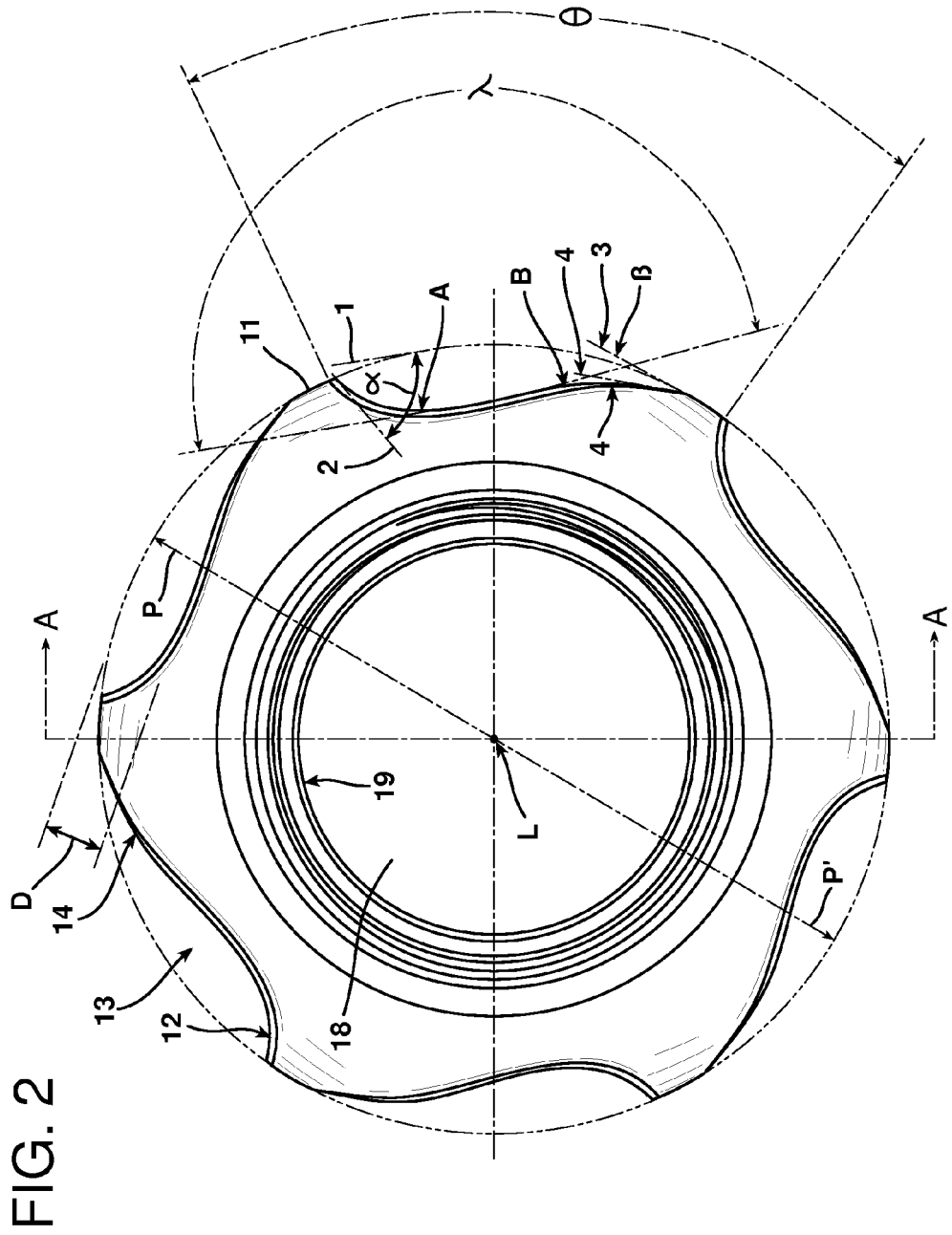

NUT FOR ATTACHING TWO DEVICES AND METHOD FOR PROVIDING THE SAME

FIELD OF THE INVENTION

The present invention relates generally to a nut for attaching two devices together, wherein the nut provides visual and tactile signals as to the correct rotational direction and methods for providing the same. More particularly, the present invention relates to a nut for attaching a water device such as a water filter system to a water supply such as a faucet, wherein the nut provides visual and tactile signals as to the rotational direction required to tighten and/or install the nut onto the water supply and methods for providing the same.

BACKGROUND OF THE INVENTION

Nuts for attaching devices such as a water filter system to a second device such as a water supply (e.g., faucet) are well known in the art. These nuts generally have a hexagonal-shaped body or a body having a plurality of ribs or protrusions ("rib/protrusion" nut) extending from and disposed along a circumference of the body. The hexagonal-shaped nut includes pairs of intersecting faces that form six vertices to form its hexagonal shape. The hexagonal-shaped nut is symmetrical relative to planes that contain either pairs of opposing midpoints of the hexagonal faces or opposing vertices and the longitudinal axis of the nut. With respect to the "rib/protrusion" nut designs, such designs also include a plurality of two intersecting faces that form a plurality of ribs or protrusions. Similar to the hexagonal nut, the "rib/protrusion" nut designs are symmetrical relative to planes that contain a protrusion and the longitudinal axis of the nut.

The portion of the faces near the vertices of the hexagonal nut design and/or the faces of the ribs or protrusions of the rib/protrusion nut design provide a face of equal leverage for a user to grip and/or apply pressure to with his/her hand or fingers no matter which direction the user is rotating the nut (e.g., clockwise or counter-clockwise). In other words, the conventional nut designs are bi-directional because they provide a user the same tactile and visual signals in either direction of rotation. This often causes a user confusion as to which direction the nut should be rotated in order to tighten or loosen it.

Accordingly, an improved nut design and method for providing the same are needed in order to inform the user as to the direction that it should be turned to either tighten or loosen it.

SUMMARY OF THE INVENTION

The present invention is directed to a nut for attaching two devices, wherein the nut provides visual and tactile signals as to the correct rotational direction of the nut.

One embodiment of the present invention is a nut that includes a body having an aperture disposed within the body, threads located within the aperture of the body, and a plurality of gripping areas disposed along a circumference of the body. The plurality of gripping areas provides visual and tactile directional signals as to the rotational direction required to attach or detach the nut to or from a threaded member.

Another embodiment of the present invention is a nut for attaching a first device to a second device that includes a body having a threaded aperture disposed within the body and a plurality of protrusions circumferentially positioned along and extending from a perimeter of the body. The plurality of protrusions comprises a pressure-bearing face and a non-pressure-bearing face.

Yet another embodiment of the present invention is an asymmetrical nut for attaching a water device to a water supply that includes a nut body having a circular aperture disposed within the body and a plurality of unidirectional gripping areas circumferentially positioned along a perimeter of the body. The body is asymmetrical with respect to any plane that contains the longitudinal axis of the nut body.

One embodiment of the present invention is a method for providing a nut with visual and tactile signals for attaching the nut to a threaded member. The method includes providing a nut body and forming a plurality of unidirectional gripping areas along a circumference of the body such that the plurality of gripping areas provides visual and tactile directional signals as to the correct rotational direction required to attach the nut to a threaded member.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

FIG. 2 is a top plan view of the exemplary nut according to FIG. 1;

Figure 1:
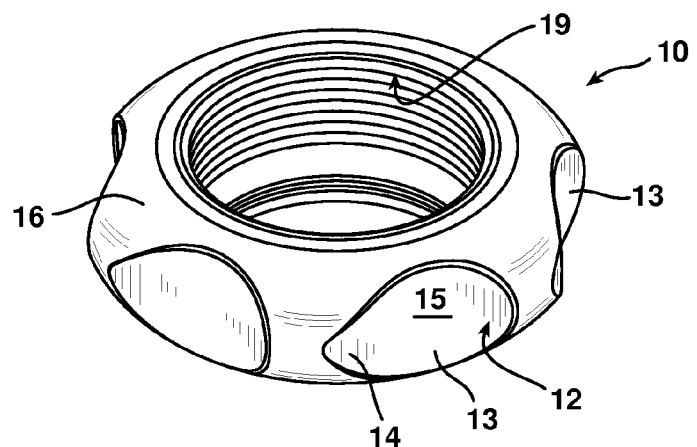
FIG. 1 is a perspective view of an exemplary nut according to an embodiment of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION OF THE INVENTION

Reference will now be made in detail to various embodiments of the invention, examples of which are illustrated in the accompanying drawings, wherein like numerals indicate similar elements throughout the views.

Figure 3:
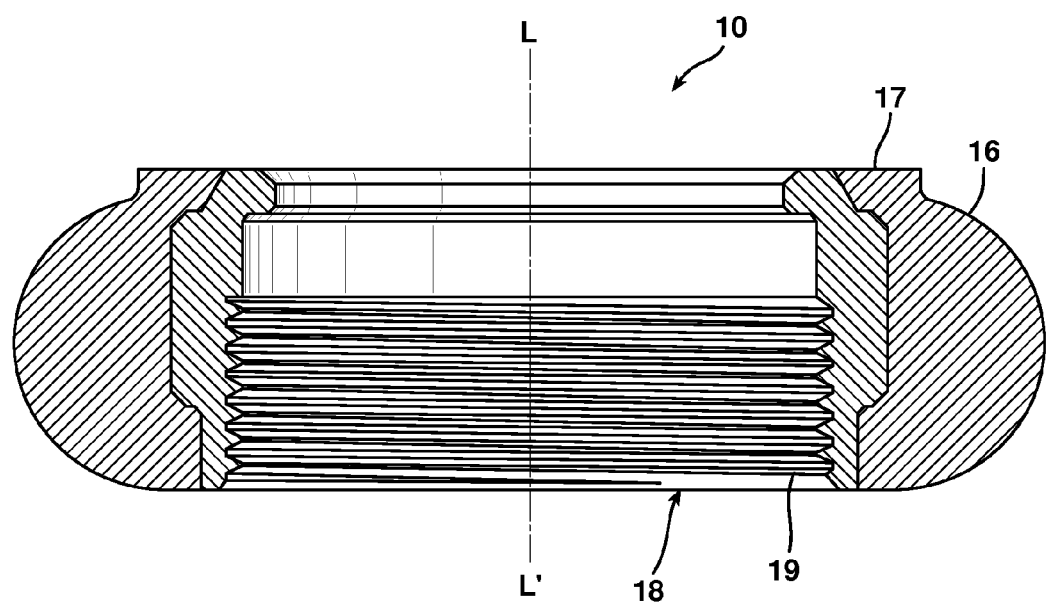
FIG. 3 is a cross sectional view of the exemplary nut taken along A-A of FIG. 2.

FIGS. 1-3 show an exemplary embodiment of a nut 10 according to the present invention. Nut 10 may include a body 16, a circular aperture 18 disposed through body 16, and a plurality of gripping areas 13 positioned along and/or disposed within a circumference or perimeter 11 of body 16. Nut body 16 may be fabricated using any conventional methods such as compression or injection molding and/or machining from a variety of conventional materials, including but not limited to metals, plastics such as polymers (e.g., acrylonitrile butadiene styrene (ABS), polycarbonate, polyethylene), composite materials, or any combination thereof as known to one of ordinary skill in the art. Aperture 18 may also include internal threads 19 located within it. Threads 19 may also comprise any conventional threading and be fabricated from a variety of materials such as metal, plastics (e.g., polymers), composite materials, or any combination thereof as known to one of ordinary skill in the art. Also, threads 19 may be part of an insert that is installed within and connected to aperture 18 or formed as an integral part of aperture 18 itself.

Figure 8:
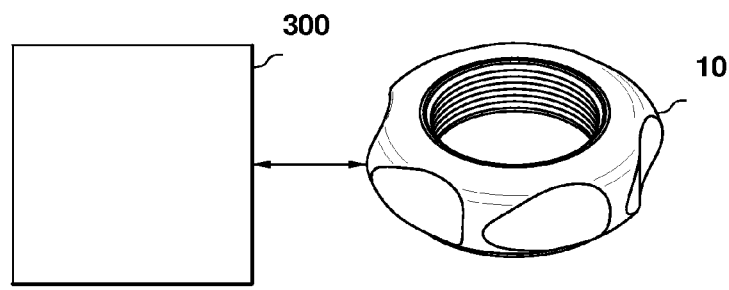
FIG. 8 is a view of the exemplary nut to be attached with a water filter system.
Figure 9:
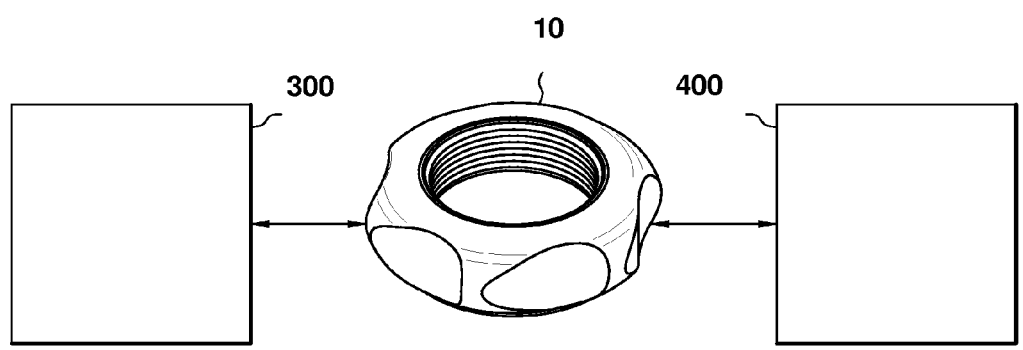
FIG. 9 is a view of the exemplary nut to be attached with a water filter system.

As depicted in FIGS. 8 and 9, the exemplary nut 10 may be configured to be connected or attached to a conventional faucet mounted water filter system 300 such that nut 10 may be used to attach, connect, or mount the water filter system 300 to a water faucet 400. For example, threads 19 may be configured to threadingly engage external threads disposed on an end of a water faucet 400 in order to attach, connect, or mount the water filter system 300 to the water faucet 400. Although not required, nut 10 may also include a gasket or seal (not shown) that is configured to make the nut connection to the faucet waterproof or leak proof. It is understood that this and other examples shown and described herein are used for illustration purposes, and not limitation. It is also understood that nut 10 may be used to connect other devices such as other water devices such as a sprayer to water supplies such as a hose, pump, etc. as known to one of ordinary skill in the art.

As set forth above, plurality of gripping areas 13 may be disposed within body 16 along circumference 11. Gripping areas 13 may comprise a surface 15, a pressure bearing face 12, and a non-pressure bearing face 14. Surface 15 may be fabricated from the same material as the body or a separate material such a low durometer plastic. A low durometer plastic may be desirable for at least a portion of surface 15 in order to provide a soft touch or feel to a user when making contact or gripping nut 10. An exemplary plastic that may be used to partially cover or fabricate surface 15 may comprise a low durometer elastomer.

Pressure bearing face 12 may comprise an angle of leverage α and non-pressure bearing face 14 may comprise an angle of leverage β. Angle of leverage α is measured from a hypothetical line 1 that is tangent to circumference 11 and a hypothetical line 2 that is tangent to the slope of the initial curvature (conic, spherical or linear) defining face 12. Angle of leverage β is measured from a hypothetical line 3 that is tangent to circumference 11 and a hypothetical line 4 that is tangent to the slope of the initial curvature (conic, spherical or linear) defining face 14. In the present invention, angle of leverage α may range from about 10 degrees to about 90 degrees, and angle of leverage β may range from about 0 degrees to about 90 degrees. The angle of leverage (α and β) defines the angle of the face (e.g., pressure bearing face 12 or non-pressure bearing face 14) available to make contact with a user's hand or fingers when attempting to grip and turn the nut. For example, the greater the angle of leverage (the closer the angle is to 90 degrees), the greater the slope of the face and thus the more face that is available for the user's hand or fingers to apply pressure against. As used herein, a "non-pressure bearing face" is defined as a face that has an angle of leverage (e.g., angle β) that is less than the angle of leverage (e.g., angle α) of an adjacent pressure bearing face of the same nut.

In the one exemplary embodiment set forth in FIG. 2, non-pressure bearing face 14 has an angle of leverage β that is less than the angle of leverage α of pressure bearing face 12, thus forming face 14 into the non-pressure bearing face. In the exemplary embodiment, angle of leverage α may range from about 30 degrees to about 90 degrees (e.g., about 60 degrees) and angle of leverage β may range from about 10 degrees to about 60 degrees (e.g., about 30 degrees). It is understood that the angle of leverage may comprise an angle greater than 90 degrees in other alternative embodiments. As shown in FIG. 2, pressure bearing faces 12 and non-pressure bearing faces 14 cause nut 10 and gripping areas 13 to have an asymmetrical shape relative to any plane (e.g., P-P') that contains the longitudinal axis L-L' of nut 10.

It has been discovered that since nut 10 includes gripping areas 13 that comprise a pressure bearing face and a non-pressure bearing face (i.e., angle β is less than angle α), nut 10 provides a user both visual and tactile signals as to which rotational direction is the correct direction such as which rotational direction is required to tighten nut 10 to install a filter system onto a faucet. It is understood that the nut may be alternatively configured to provide visual and tactile signals as to which rotational direction is required to loosen nut 10. A nut of the present invention that provides visual and tactile signals as to which single rotational direction is correct is defined herein as unidirectional This is very beneficial to a user when trying to install a faucet mounted water filter system onto a water faucet because the visual and tactile signals simplify and expedite the installation of the filter system by eliminating uncertainty about correct rotation of the nut. Such visual and tactile signals found in the present invention are absent from conventional nut designs.

Conventional nut designs generally have gripping areas or protrusions/ribs that include two pressure bearing faces adjacent to each other and lack a non-pressure bearing face. Such designs provide conventional nuts with a symmetrical shape. Since the nuts do not have gripping areas with a pressure bearing face and a non-pressure bearing face (having an angle of leverage less than the angle of leverage of the pressure bearing face), conventional nuts do not provide a user visual or tactile signals as to the correct and/or desired rotational direction (e.g., which direction is required to tighten and/or install the nut). If anything, the conventional nut designs provide a user visual and tactile signals that the nut may be rotated in either direction, thus allowing the user to become confused as to which is the correct rotational direction.

In addition, body 16 may be fabricated such that it has a top surface 17 that is configured to be level or linear (i.e., no curvature) such that a user may use the top surface to align the nut in an orientation that permits easy threading of the nut onto the faucet during the installation of the water filter system. As shown in FIG. 2, the curvature of gripping areas 13, essentially are located between pressure bearing face 12 and non-pressure bearing face 14, may be further defined by a depth (D) of gripping areas 13, a radius (B) of non-pressure bearing face, and a conic arc. The conic arc may comprise a RHO value (A) and an angle λ of the conic arc's trailing edge. In the exemplary embodiment, depth (D) may range from about 0.115 inches to about 0.220 inches, radius (B) may range from about 0.3 inches to about 1.5 inches, RHO value (A) may range from about 0.5 to about 0.75, and angle λ may range an angle from about 130 degrees to about 190 degrees. In one exemplary embodiment, depth (D) is about 0.1 inches, radius (B) is about 1.0 inches, RHO value (A) is about 0.5, radius (B) is about 1.0 inches, and angle λ is about 175 degrees. As shown, this exemplary embodiment comprises gripping areas having a smooth, curvilinear shape. However, it is understood that gripping areas 13, including pressure bearing and non-pressure bearing faces 12 and 14, may comprise other curvilinear, linear, non-linear, or any other shape as known to one of ordinary skill in the art.

The plurality of pressure bearing faces 12 may be positioned or spaced-apart from each other at a variety of intervals along circumference 11. For example, each pressure bearing face of the plurality of pressure bearing faces may be spaced from each other at an angle θ of from about 1 degree to about 180 degrees, alternatively from about 30 degrees to about 90 degrees. In the exemplary embodiment shown in FIGS. 1-3, angle θ is about 60 degrees between each pressure bearing face 12.

Figure 4:
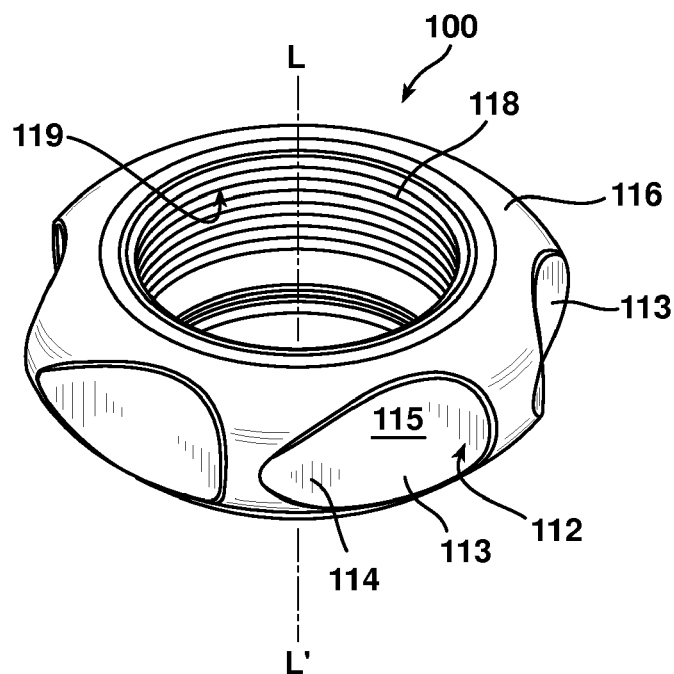
FIG. 4 is a perspective view of an exemplary nut according to an embodiment of the present invention.
Figure 5:
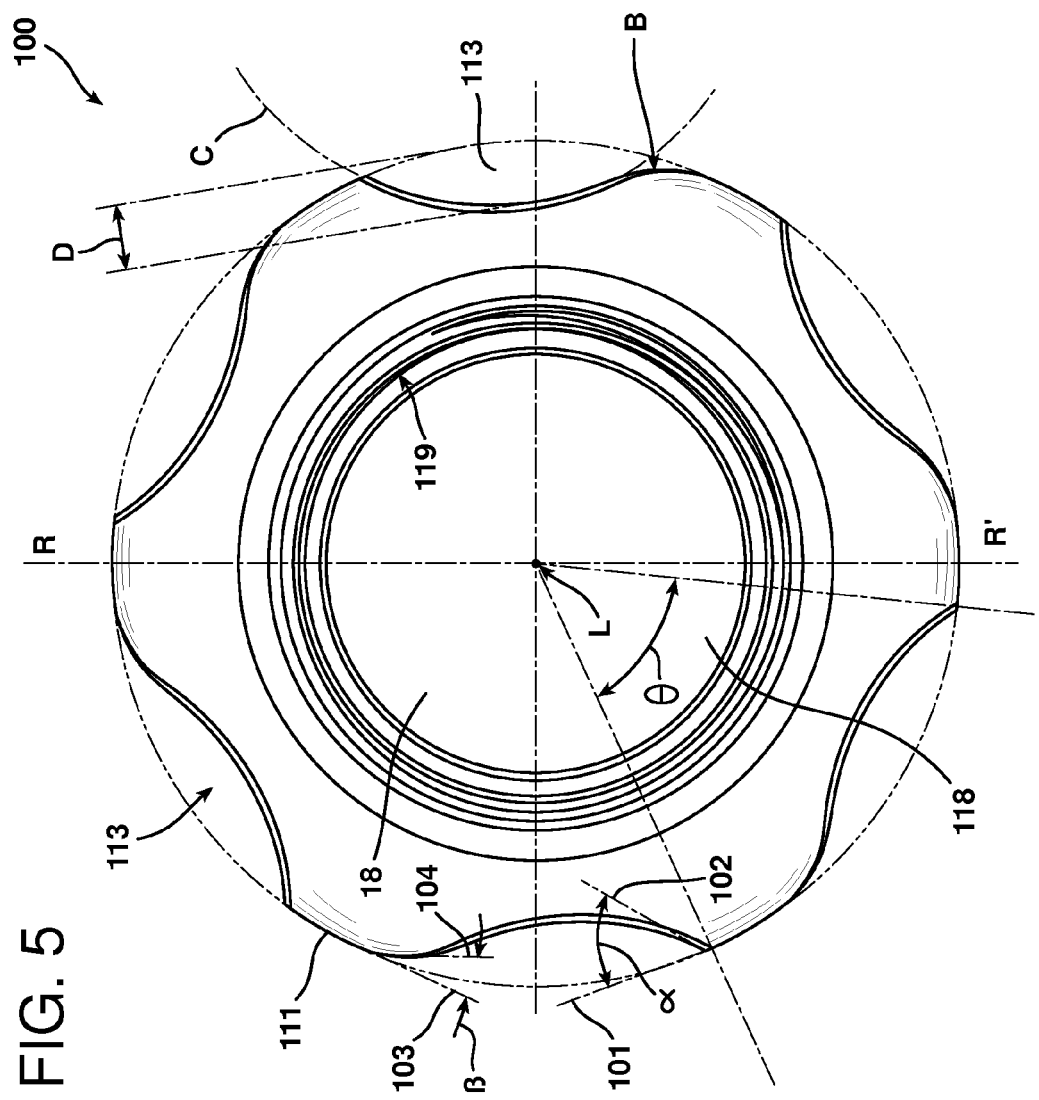
FIG. 5 is a top plan view of the exemplary nut according to FIG. 4.

Referring to FIGS. 4 and 5, another exemplary embodiment of a nut 100 according to the present invention is shown. Nut 100 may include a body 116, a circular aperture 118 disposed through body 116, and a plurality of gripping areas 113 positioned along and/or disposed within a circumference or perimeter 111 of body 116. Gripping areas 113 may be disposed along circumference 111 such that each pressure bearing face 112 is spaced about 60 degrees (angle θ) along circumference 111 from an adjacent pressure bearing face 112. It is understood, however, the angle θ may range from about 1 degree to about 180 degrees.

As set forth above, nut body 116 may be fabricated using any conventional methods such as compression or injection molding and/or machining from a variety of conventional materials, including but not limited to metals, plastics such as polymers (e.g., acrylonitrile butadiene styrene (ABS), polycarbonate, polyethylene), composite materials, or any combination thereof as known to one of ordinary skill in the art. Aperture 118 may also include internal threads 119 located within it. In addition, threads 119 may also comprise any conventional threading and be fabricated from a variety of materials such as metal, plastics (e.g., polymers), composite materials, or any combination thereof as known to one of ordinary skill in the art. In the exemplary embodiment shown, threads 119 are a separate unit that is inserted into aperture 118 and attached to body 116.

The exemplary nut shown may be configured to be connected to a conventional faucet mounted water filter system 300 such that nut 100 may be used to attach, connect, or mount the water filter system 300 to a water faucet 400. Threads 119 may be configured to threadingly engage external threads disposed on an end of the water faucet in order to connect the water filter system 300 to the water faucet 400. Nut 100 may include other components such as a gasket described above herein or other components as would be known to one of ordinary skill in the art. It is understood that nut 100 may be used to connect other devices such as other water devices such as a sprayer to water supplies such as a hose, pump, etc. as known to one of ordinary skill in the art.

As shown in FIGS. 4 and 5, gripping areas 113 may comprise a surface 115, a pressure bearing face 112, and a non-pressure bearing face 114. Surface 115 may be at least partially fabricated from the same material as the body or a separate material such a low durometer plastic (e.g., an elastomer) to provide a soft touch or feel to a user when making contact or gripping nut 110. Pressure bearing face 112 may comprise an angle of leverage α and non-pressure bearing face 114 may comprise an angle of leverage β. Angle of leverage α is measured from a hypothetical line 101 that is tangent to circumference 111 and a hypothetical line 102 that is tangent to the slope of the initial curvature (conic, spherical or linear) defining face 112. Angle of leverage β is measured from a hypothetical line 103 that is tangent to circumference 111 and a hypothetical line 104 that is tangent to the slope of the initial curvature (conic, spherical or linear) defining face 114.

In the exemplary embodiment, angle of leverage α may range from about 10 degrees to about 90 degrees, and angle of leverage β may range from about 0 degrees to about 90 degrees. The angle of leverage (α and β) defines the angle of the face (e.g., pressure bearing face 112 or non-pressure bearing face 114) available to make contact with a user's hand or fingers when attempting to grip and turn the nut. For example, the greater the angle of leverage (the closer the angle is to 90 degrees), the greater the slope of the face and thus the more face that is available for the user's hand or fingers to apply pressure against.

In the exemplary embodiment, angle of leverage α is about 60 degrees and angle of leverage β is about 30 degrees. Since the angle of leverage β of non-pressure bearing face 114 is less than the angle of leverage α of pressure bearing face 112, nut 100 provides a user with both visual and tactile signals as to the correct, required, or desired rotational direction (e.g., which direction is required to tighten and/or install nut 100 onto a device such as a water supply, particularly a faucet). As set forth above, such visual and tactile signals discovered and found in the present invention are absent from conventional nut designs. Pressure bearing faces 112 and non-pressure bearing faces 114 and their corresponding angles of leverage cause nut 100 and gripping areas 113 to have an asymmetrical shape relative to any plane (e.g., R-R') that contains the longitudinal axis L-L' of nut 100.

Still referring to FIG. 5, the curvature of gripping areas 113 may be further defined by three measurements: a depth (D) of gripping areas 113; a radius (B) of non-pressure bearing face 114; and a radius (C) of pressure bearing face 112. In the exemplary embodiment shown, depth (D) is about 0.1 inches, radius (B) is about 0.5 inches, and radius (C) is about 1 inch. Unlike the embodiment shown in FIGS. 1-3, the curvature of the gripping areas shown in FIGS. 4 and 5 are not formed by a conic arc. Thus, since the exemplary embodiment shown in FIGS. 4 and 5 does not include a conic arc, gripping areas 113 do not have a RHO value or an angle λ, which are measurements defining a conic arc. As shown, this exemplary embodiment comprises gripping areas having a smooth, curvilinear shape as well.

Figure 7:
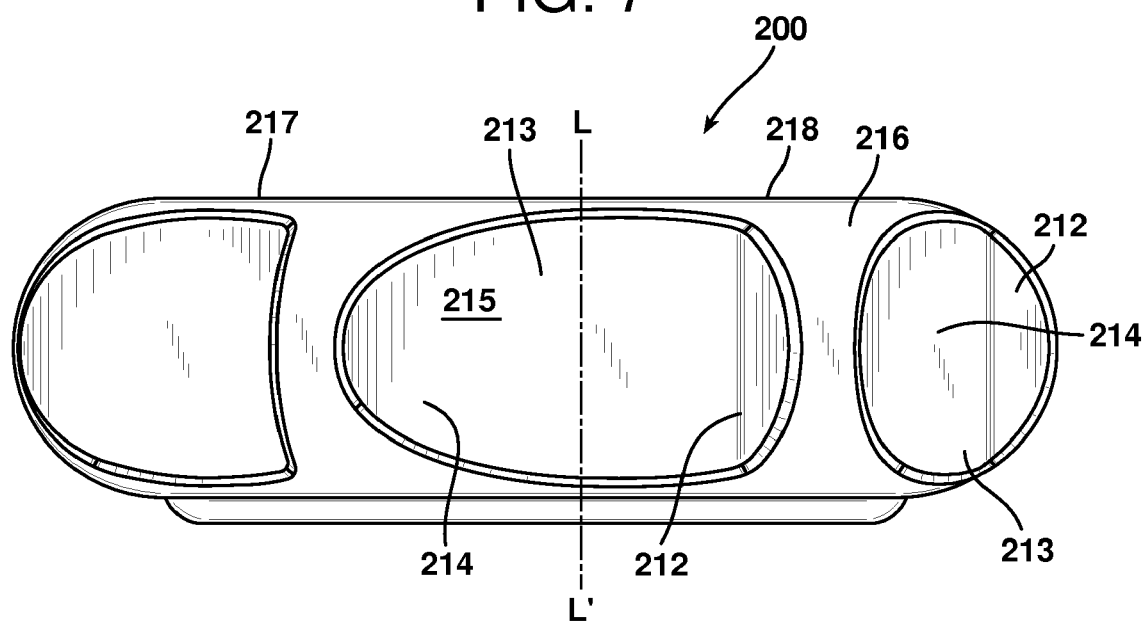
FIG. 7 is a side elevational view.
Figure 6:
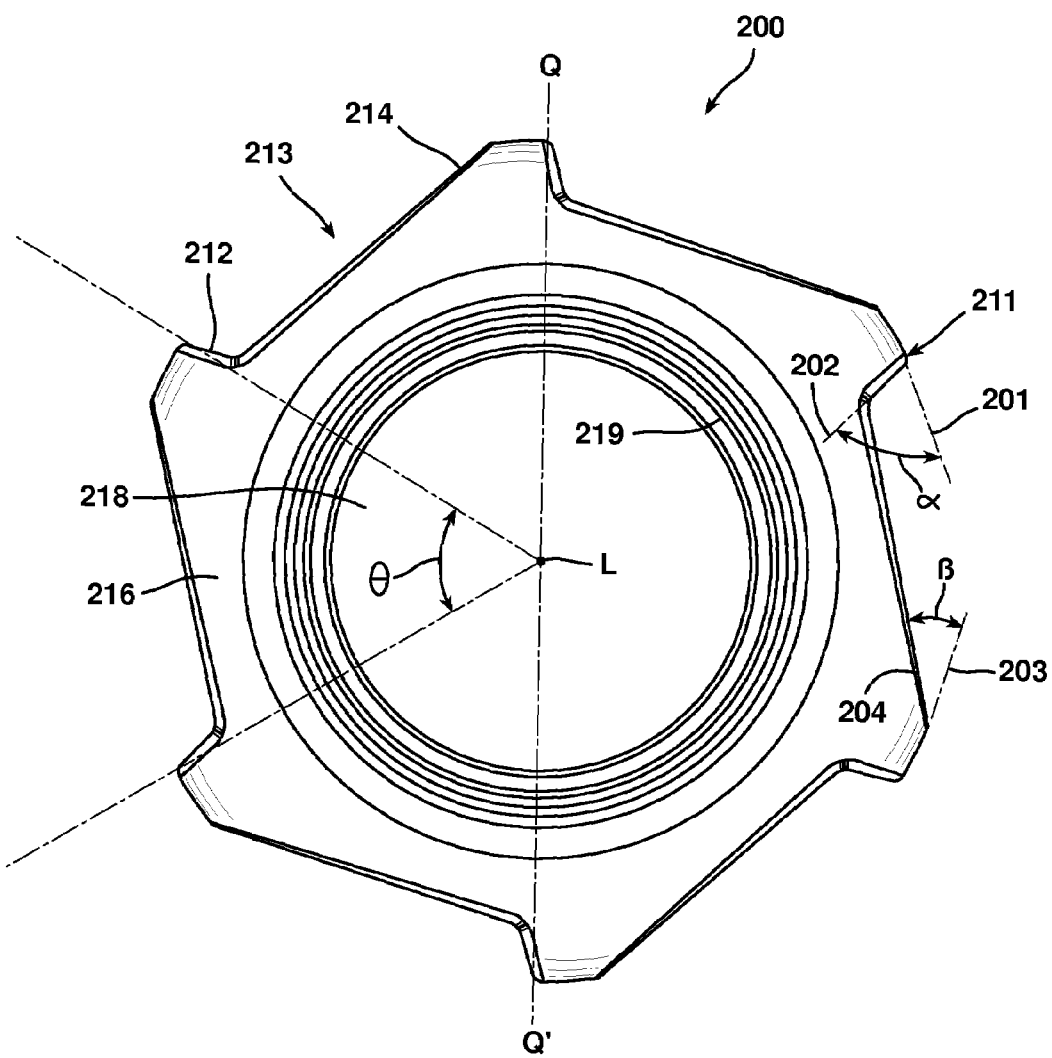
FIG. 6 is a top plan view of an exemplary nut according to an embodiment of the present invention.

Referring to FIGS. 6 and 7, another exemplary embodiment of a nut 200 according to the present invention is shown. Nut 200 may include a body 216, a circular aperture 218 disposed through body 216, and a plurality of gripping areas 213 positioned along and/or disposed within a circumference or perimeter 211 of body 216. Gripping areas 213 may bee disposed along circumference 211 such that each pressure bearing face 212 is spaced about 60 degrees (angle θ) along circumference 211 from an adjacent pressure bearing face 212. It is understood that angle θ may range from about 1 degree to about 180 degrees.

As set forth above, nut body 216 may be fabricated using any conventional methods such as compression or injection molding and/or machining from a variety of conventional materials, including but not limited to metals, plastics such as polymers (e.g., acrylonitrile butadiene styrene (ABS), polycarbonate, polyethylene), composite materials, or any combination thereof as known to one of ordinary skill in the art. Aperture 218 may also include internal threads 219 located within it. In addition, threads 219 may also comprise any conventional threading and be fabricated from a variety of materials such as metal, plastics (e.g., polymers), composite materials, or any combination thereof as known to one of ordinary skill in the art. In the exemplary embodiment shown, threads 219 may be formed within and be integral to aperture 218 or be a separate unit that is inserted into aperture 218 and attached to body 216.

Again, the exemplary nut shown may be configured to be connected to a conventional faucet mounted water filter system 300 such that nut 200 may be used to attach, connect, or mount the water filter system 300 to a water faucet 400. Threads 219 may be configured to threadingly engage external threads disposed on an end of the water faucet 400 in order to connect the water filter system 300 to the water faucet 400.

Nut 200 may include other components such as a gasket described above herein or other components as would be known to one of ordinary skill in the art. It is understood that nut 200 may be used to connect other devices such as other water devices such as a sprayer to water supplies such as a hose, pump, etc. as known to one of ordinary skill in the art.

As shown in FIGS. 6 and 7, gripping areas 213 may comprise a surface 215, a pressure bearing face 212, and a non-pressure bearing face 214. Surface 215 may be at least partially fabricated from the same material as the body or a separate material such a low durometer plastic (e.g., an elastomer) to provide a soft touch or feel to a user when making contact or gripping nut 200. In addition, pressure bearing face 212 may comprise an angle of leverage $\alpha$ and non-pressure bearing face 214 may comprise an angle of leverage $\beta$. Angle of leverage $\alpha$ is measured from a hypothetical line 201 that is tangent to circumference 211 and a hypothetical line 202 that is tangent to the slope of the initial curvature (conic, spherical or linear) defining face 212. Angle of leverage $\beta$ is measured from a hypothetical line 203 that is tangent to circumference 211 and a hypothetical line 204 that is tangent to the slope of the initial linear surface defining face 214.

In the exemplary embodiment, angle of leverage $\alpha$ is about 60 degrees and angle of leverage $\beta$ is about 15 degrees. Since the angle of leverage $\beta$ of non-pressure bearing face 214 is less than the angle of leverage $\alpha$ of pressure bearing face 212, nut 200 provides a user with both visual and tactile signals as to the correct rotational direction (e.g., which rotational direction is required to tighten and/or install nut 200 onto a device such as a water supply, particularly a faucet). Such visual and tactile signals found in the present invention are absent from conventional nut designs. Pressure bearing faces 212 and non-pressure bearing faces 214 and their corresponding angles of leverage cause nut 200 and gripping areas 213 to have an asymmetrical shape relative to any plane (e.g., Q-Q') that contains the longitudinal axis L-L' of nut 200. Unlike the gripping areas of the other exemplary embodiments set forth above herein, gripping areas 213 of this exemplary embodiment do not comprise a smooth, curvilinear shape such as a conic arc. As shown, gripping areas 213 comprise a linear shape.

All documents cited in the Detailed Description of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A nut, comprising:
    a body having an aperture disposed within the body and a longitudinal axis;
    threads located within the aperture of the body; and
    a plurality of gripping areas disposed along a circumference of the body and completely through the body along the longitudinal axis;
    wherein each of the plurality of gripping areas comprises a pressure-bearing face having an angle of leverage $\alpha$ and a non-pressure-bearing face having an angle of leverage $\beta$;
    wherein the angle of leverage $\alpha$ is greater than the angle of leverage $\beta$;
    wherein the plurality of gripping areas provides visual and tactile directional signals as to the rotational direction required to attach or detach the nut to or from a threaded member;
    wherein the angle of leverage $\alpha$ is from about 30 degrees to about 90 degrees for the pressure bearing faces and the angle of leverage $\beta$ is from about 10 degrees to about 60 degrees for the non-pressure bearing faces; and
    wherein the gripping areas include a curvature that is defined by a finger recess depth (D) that ranges from about 0.115 inches to about 0.220 inches and a conic arc, and wherein the conic arc is further defined by a RHO value of the conic arc that ranges from about 0.5 to about 0.75, an angle $\lambda$ of the conic arc trailing edge that ranges from about 130 degrees to about 190 degrees, and a radius (B) of the non-pressure bearing face that ranges from about 0.3 inches to about 1.5 inches.

2. The nut according to claim 1, wherein each of the gripping areas is asymmetrical relative to any plane that contains the longitudinal axis of the nut.

3. The nut according to claim 1, wherein the body is asymmetrical relative to any plane that contains the longitudinal axis of the nut.

4. The nut according to claim 1, wherein the gripping areas include at least a partially textured surface.

5. The nut according to claim 1, wherein the gripping areas have a surface comprising an elastomer.

6. The nut according to claim 1, wherein the plurality of gripping areas are unidirectional.

7. A method of attaching a faucet mount water filter device to a threaded end of a water faucet, comprising:
    attaching a nut according to claim 1 to a faucet mount water filter device such that an end of the nut is rotatably connected to the faucet mount water filter device; and
    threadingly connecting the nut and connected faucet mount water filter device to a threaded end of a water faucet.

8. A method for providing a nut with visual and tactile signals for attaching the nut to a threaded member, comprising:
    providing a nut body having a longitudinal axis and an aperture disposed within the body and about the longitudinal axis;
    forming a plurality of unidirectional gripping areas along a circumference of the body and completely through the body along the longitudinal axis;
    forming a pressure bearing face on each of the plurality of unidirectional gripping areas;
    forming a non-pressure bearing face on each of the plurality of unidirectional gripping areas; and
    forming each of the pressure bearing faces to include an angle of leverage $\alpha$ and each of the non-pressure bearing faces to include an angle of leverage $\beta$, wherein the angle of leverage $\alpha$ is greater than the angle of leverage $\beta$ such that the plurality of gripping areas provides visual and tactile directional signals as to the correct rotational direction required to attach the nut to a threaded member;
    wherein the angle of leverage $\alpha$ is from about 30 degrees to about 90 degrees for the pressure bearing faces and the angle of leverage $\beta$ is from about 10 degrees to about 60 degrees for the non-pressure bearing faces; and
    wherein the gripping areas include a curvature that is defined by a finger recess depth (D) that ranges from about 0.115 inches to about 0.220 inches and a conic arc, and wherein the conic arc is further defined by a RHO value of the conic arc that ranges from about 0.5 to about 0.75, an angle $\lambda$ of the conic arc trailing edge that ranges from about 130 degrees to about 190 degrees, and a radius (B) of the non-pressure bearing face that ranges from about 0.3 inches to about 1.5 inches.

9. The method according to claim 8, further providing the nut attached to a water filtration system.

10. The method according to claim 8, further comprising forming a substantially flat upper surface of the body.

* * * * *